Aug. 31, 1965        B. W. MOGOLIS        3,203,608
STOCK HANDLING APPARATUS
Filed Sept. 25, 1963        3 Sheets-Sheet 1
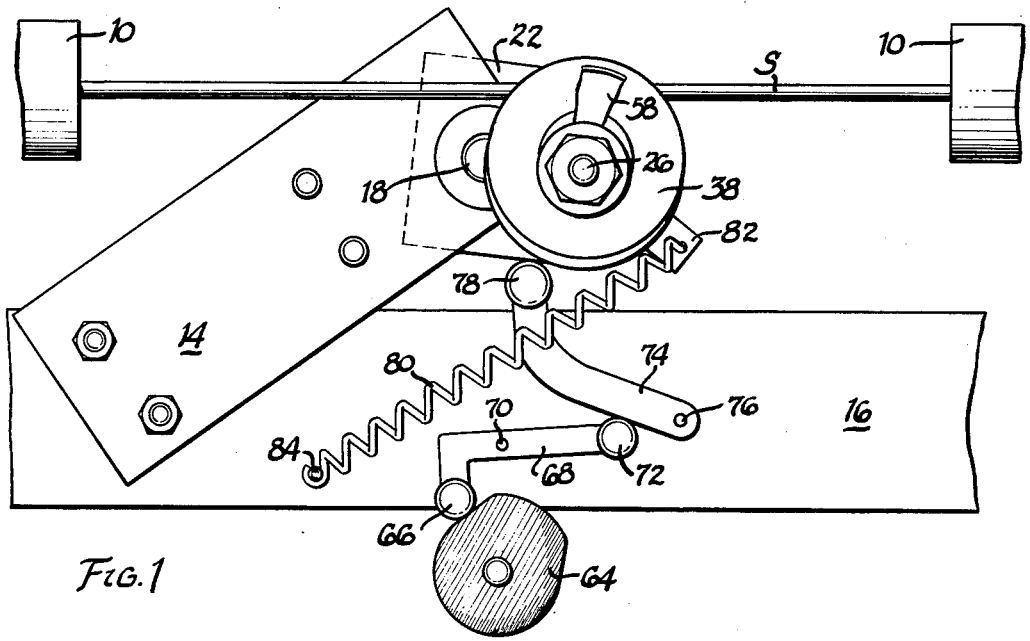
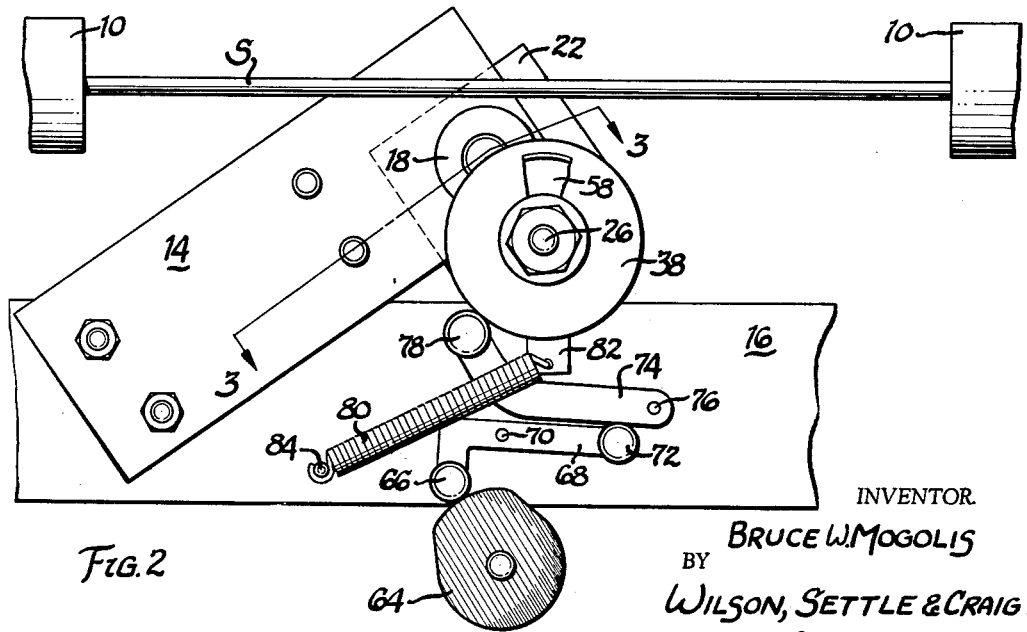
INVENTOR.
BRUCE W. MOGOLIS
BY WILSON, SETTLE & CRAIG
ATTORNEYS Aug. 31, 1965  B. W. MOGOLIS  3,203,608
STOCK HANDLING APPARATUS
Filed Sept. 25, 1963  3 Sheets-Sheet 2

INVENTOR.
BRUCE W. MOGOLIS
BY
WILSON, SETTLE & CRAIG
ATTORNEYS

Aug. 31, 1965         B. W. MOGOLIS         3,203,608
STOCK HANDLING APPARATUS
Filed Sept. 25, 1963                3 Sheets-Sheet 3
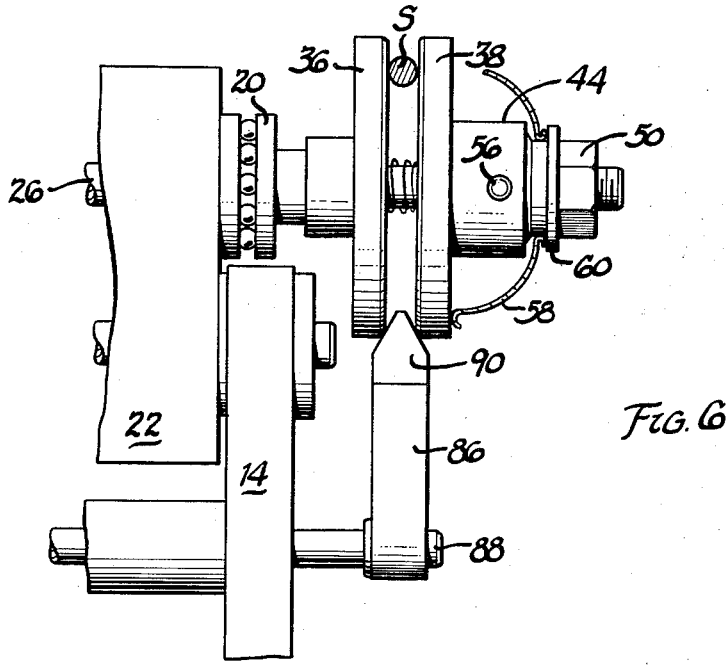
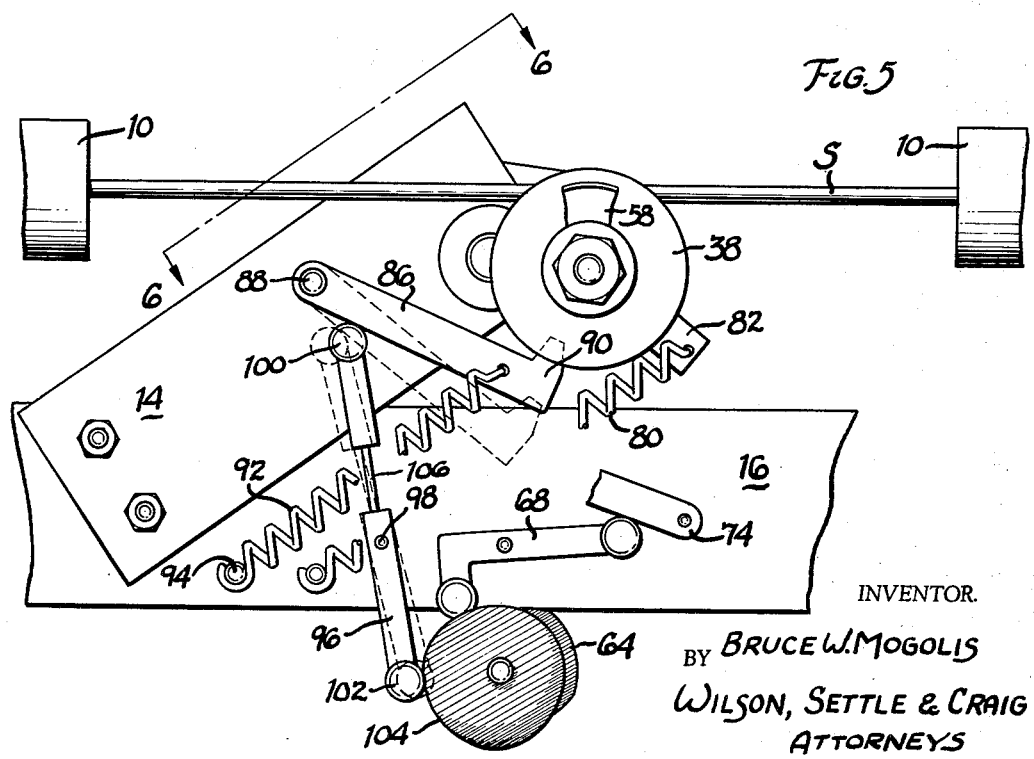
INVENTOR.
BY BRUCE W. MOGOLIS
WILSON, SETTLE & CRAIG
ATTORNEYS `United States Patent Office`

3,203,608
Patented Aug. 31, 1965

1

3,203,608
STOCK HANDLING APPARATUS
Bruce W. Mogolis, Dearborn, Mich., assignor to Bruce
Machining & Engineering, Inc., Dearborn, Mich., a
corporation of Michigan
Filed Sept. 25, 1963, Ser. No. 311,392
13 Claims. (Cl. 226—124)

This invention relates to stock handling apparatus and more particularly for apparatus for feeding elongate rod-like stock longitudinally to a desired position as in the advancement of rod stock to the tools of a multiple spindle screw machine.

In multiple spindle screw machines, elongate rod stock to be operated upon by the machine is supported in a turret at symmetrically disposed positions about the axis of rotation of the turret, with the stock extending parallel to the turret axis. The turret is rotated in step-by-step movement to successively rotatably advance the stock into alignment with tools located at correspondingly spaced positions upon the machine. When the stock is located in alignment with the tool, it is then necessary at certain stations to longitudinally advance the stock through its spindle into operative relationship with the tool. Such machines must be capable not only of handling round stock of various diameters, but also frequently are called upon to handle stock of non-circular cross section and to also be capable of accommodating non-circular stock of various sizes.

It is a primary object of the present invention to provide stock feeding apparatus for longitudinally feeding rod stock of different sizes and cross sectional configurations.

It is another object of the invention to provide stock feeding apparatus operable to feed stock longitudinally by frictionally gripping the stock and wherein the degree of frictional grip on the stock may be varied during the feeding operation.

It is another object of the invention to provide stock feeding apparatus for feeding elongate rod-like stock wherein the stock gripping elements of the apparatus accommodate themselves to the cross section of the stock.

Still another object of the invention is to provide stock feeding apparatus for feeding elongate rod stock which may be readily engaged and disengaged from the stock.

The foregoing and other objects are achieved in a stock feeding apparatus wherein a pair of feeding discs are supported in opposed face-to-face relationship with each other upon a rotary shaft. Both discs are coupled to the shaft for rotation with the shaft and one of the discs is fixedly secured to the shaft so that its face rotates in a fixed plane perpendicular to the shaft axis. The other of the discs is capable of limited tilting movement into and out of parallelism with the face of the fixed disc. The stock being fed is frictionally gripped between the opposed faces of the discs, the tilting disc being resiliently biased toward parallelism with the fixed disc and thus being capable of tilting movement to permit the stock to enter between the disc faces until the desired frictional grip is achieved. A stock locking mechanism which includes a pointed toe capable of being forced between the discs at a position diametrically opposite that at which the stock is gripped may be employed to increase the frictional grip of the discs upon the stock.

The shaft which carries the two discs carries a pinion gear which is meshed with a driving gear supported upon a second shaft disposed in spaced parallel relationship with the disc carrying shaft. The disc carrying shaft is mounted in a housing which in turn may rotate about the axis of the driving shaft, thereby permitting the feed discs to move to and from a feeding position by rotation of the housing about the axis of the second shaft.

2

Other objects and features of the invention will become apparent by reference to the following specification and to the drawings.

In the drawings:

FIGURE 1 is a side elevational view with certain parts broken away, omitted, or shown in cross section, showing a stock feeder embodying the present invention in its operative or feeding position;

FIGURE 2 is a side elevational view, similar to FIGURE 1, showing the stock feeder in its non-operative or disengaged position;

FIGURE 5 is a side elevational view, similar to FIGURE 1, with certain parts omitted, showing details of a stock locking mechanism; and FIGURE 6 is an elevational view from the line 6—6 of FIGURE 5.

Figure 3:
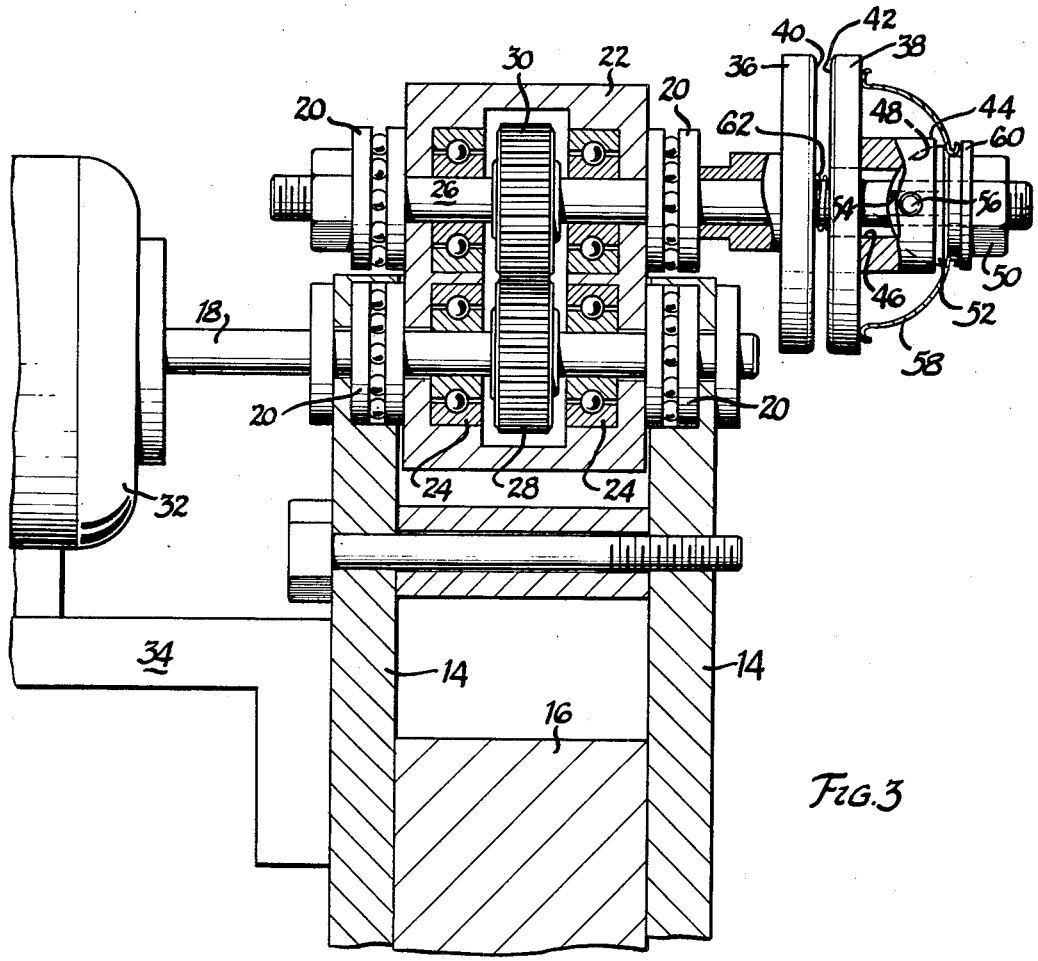
FIGURE 3 is a cross sectioinal view taken on the line 3—3 of FIGURE 2.

The stock feeder of the present invention is especially well adapted for use in feeding stock to multiple spindle screw machines. Since details of such machines are well known, only portions of a multiple spindle screw machine have been schematically illustrated in the drawings. In the drawings, rod stock S to be fed is shown as being supported and guided in a pair of spindles designated generally 10, these spindles being mounted in a well known manner upon a turret rotatable about a horizontal axis. In the usual case the turret will support four or more sets of spindles, the spindles and stock supported thereby being successively advanced by rotation of the turret to the feeding station at which the stock S is fed longitudinally from the left to right as viewed in FIGURE 1 to the particular tool, not shown.

The stock feeder of the present invention includes a fixed frame having a pair of rigid side plates 14 which are fixedly mounted upon the frame 16 of the screw machine. Referring now to FIGURE 3, a drive shaft 18 is mounted in side plates 14 for rotation about a fixed axis as by bearing assemblies 20. Between side plates 14, a housing 22 is supported for rotation upon shaft 18 as by bearings 24 mounted within housing 22. A second shaft 26 is rotatably mounted within housing 22 in parallel offset relationship to shaft 18, and drive gears 28 and 30 are fixedly mounted upon the respective shafts 18 and 26 in mesh with each other to transmit rotation of shaft 18 to shaft 26. Shaft 18 is driven in rotation by a drive motor 32 of conventional construction which is supported upon a mounting bracket such as 34 which may be fixedly mounted upon one of side plates 14 or from the screw machine frame 16.

Shaft 26 carries a pair of feed discs 36 and 38 respectively, feed disc 36 being fixedly secured to shaft 26 against both axial and rotary movement relative to the shaft. Discs 36 and 38 have opposed flat feeding faces 40 and 43 respectively, the faces being rounded off in the manner shown at the outer periphery of the discs.

Figure 4:
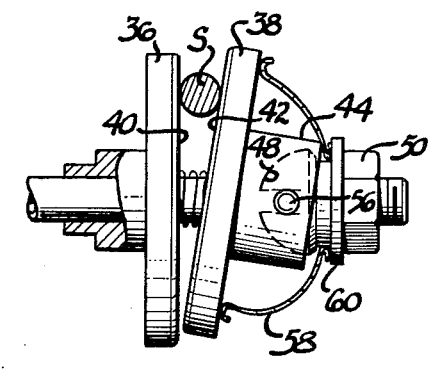
FIGURE 4 is a detailed view, partially in section, showing the relationship of the feeding discs to each other during the feeding operation.

Disc 38 is provided with a collar 44 having an enlarged central bore 46 and a concave hemispherical seat 48 flaring outwardly from bore 46 at the right hand end of the collar as viewed in FIGURE 3. A nut 50 is threadably received upon the right hand end of shaft 26 and is formed with a hemispherical projection 52 which is complementary in shape to the hemispherical recess 48 in collar 44. A diametrically extending slot 54 in the hemispherical portion 52 of nut 50 loosely receives a pair of radially extending pins or set screws 56 threadably received within collar 44 to rotatably lock collar 44 and disc 38 to shaft 26. The spherical seating engagement between collar 44 and nut 50 permits disc 38 to tilt relative to the axis of shaft 26 in the fashion shown in FIGURE 4, this tilting action being resiliently resisted by a bellville type spring 58 seated between the outer side of disc 38 and a projecting flange 60 on nut 50. Hemispherical surface 48 on collar 44 is resiliently maintained in seated engagement against hemispherical portion 52 of nut 50 by means of a compression spring 62 engaged between the opposed faces of the discs. Springs 58 and 62 normally maintain faces 40 and 42 in spaced parallel relationship with each other, the two faces normally lying in planes perpendicular to the axis of shaft 26. The axial spacing between the disc faces is determined by adjustment of nut 50 and is preferably selected to be slightly less than the thickness of stock S. The degree of tilt of disc 38 in FIGURE 4 is somewhat exaggerated to more clearly show the tilting action.

Referring now to FIGURES 1 and 2, housing 22 is rotatably positioned about the axis of drive shaft 18 by a cam actuated lever arrangement which includes a rotary cam 64. Cam 64 is driven in rotation by suitable mechanism operated by the multiple spindle screw machine with which the invention is employed, so that movement of the stock feeder between the positions shown in FIGURES 1 and 2 is synchronized with operation of the screw machine.

In FIGURE 1, the stock feeder is shown in its operative or stock feeding position in which a small radius portion of cam 64 engages a follower roller 66 mounted upon a lever 68. Lever 68 is pivoted to frame 16 as at pivot 70 and carries a second roller 72 which is engaged with the underside of a crank 74. Crank 74 is pivotally mounted on the screw machine frame 16 at 76 and carries a roller 78 at its opposite end which engages a side surface of housing 22. A tension spring 80 is connected between a bracket 82 on housing 20 and a point 84 on frame 16 so that spring 80 continuously biases housing 22 in a clockwise direction about the axis of shaft 18 as viewed in FIGURES 1 and 2.

When cam follower 66 is engaged with a small radius portion of cam 64, the parts are in the feeding position shown in FIGURE 1. When cam 64 rotates to a position such that the cam follower 66 is engaged with a large radius portion of cam 64, roller 72 of lever 68 is depressed permitting crank 74 to swing downwardly about its pivot 76 so that housing 22 can be drawn by spring 80 to the non-operative position of FIGURE 2 wherein the stock S is disposed in spaced relationship about discs 36 and 38.

When the stock feeder is in the position shown in FIGURE 1, the stock S is frictionally gripped between feed discs 36 and 38 in the fashion best shown in FIGURE 4. Operation of motor 32 drives shaft 26 and the two feed discs in rotation and the frictional grip of the discs upon the stock advances the stock in a direction from left to right as viewed in FIGURE 1.

The purpose of advancing the stock by the apparatus described above is to advance the stock into operative relationship with a tool of the screw machine which will perform an operation on the end of the stock, such as cutting a thread. In some cases, the tool operating upon the stock acts in a manner such that it resists the advancing movement of the stock or applies a force to the stock tending to move it backward. Because the advancing movement of the stock is dependent upon the frictional grip between discs 36 and 38 and the opposite sides of the stock, it is desirable in some cases to increase the frictional grip of the discs upon the stock while it is in operative relationship with the tool to assure that the stock is maintained in the desired operative relationship with the tool.

In FIGURES 5 and 6, one mechanism for accomplishing this purpose is shown. A lever 86 is pivotally supported at one end upon a stud 88 mounted on one of side plates 14. The opposite end of lever 86 is formed with a pointed toe portion 90, stud 88 being projected outwardly from side plate 14 so that toe 90, when positioned in the rotative position of FIGURE 5, is forced between the opposed plates 36 and 38 at a point diametrically opposite at which the stock S is gripped between the plates. As best seen in FIGURE 6, when toe 90 is so positioned in engagement with plates 36 and 38, disc 38 is forced from the tilted position of FIGURE 4 toward a parallel relationship with disc 36, this action effectively increasing the frictional grip of the discs upon stock S. Because the hemispherical portion 52 of nut 50 is locked against axial movement, the action of toe 90 in forcing plate 38 toward parallelism with disc 36 causes disc 38 to act as a lever having a fulcrum at the center of hemispherical surface 52. The grip exerted upon the stock S when discs 36 and 38 are in the relative position of FIGURE 4 is dependent solely upon the force of spring 58. When toe 90 is positioned as shown in FIGURE 6, the grip exerted by discs 36 and 38 is increased by the tilting of disc 38 about a fixed pivot corresponding to the center of hemispherical surface 52.

A tension spring 92 (FIGURE 5) is connected between a pin 94 on machine frame 15 and the remote end of lever 86 to normally bias lever 86 away from discs 36 and 38 to the dotted line position of FIGURE 5. Positioning of lever 86 in the operative or full line position of FIGURE 5 and the dotted line or inoperative position is accomplished by a lever 96 pivotally mounted on frame 16 by a pivot 98. A roller 100 at one end of lever 96 is in rolling engagement of the lower side of lever 86, while a cam follower roller 102 at the opposite end of lever 96 is engaged with the surface of a cam 104 which may be driven simultaneously with meter positioning cam 64. Cam 104 is provided with a large radius surface and a small radius surface, the respective surfaces being angularly oriented relative to cam 64 so that toe 90 is seated between discs 36 and 38 throughout the appropriate portion of the feeding cycle. As shown in full line in FIGURE 5, follower roller 102 is engaged with a large radius portion of cam 104, thereby seating toe 90 in its operative position. Upon rotation of cam 104 to a position where the follower roller 102 engages a small radius portion, lever 96 rotates to the dotted line position of FIGURE 5, thereby permitting lever 86 to move to its dotted line position as shown in FIGURE 5.

Preferably a portion of lever 96 is formed as a leaf spring element 106 to provide a moderate amount of flexibility to reduce the degree of precision required in adjusting nut 50 to the size of stock being handled.

While one embodiment of the invention has been described in detail, it will be apparent to those skilled in the art that the disclosed embodiment may be modified. Therefore, the foregoing description is to be considered exemplary rather than limiting and the true scope of the invention is that defined in the following claims.

I claim:

1. Stock feeding apparatus for longitudinally feeding elongated rod stock along a predetermined path comprising a shaft mounted for rotation about an axis perpendicular to and offset from said predetermined path, a pair of feed discs mounted on said shaft for rotation therewith, means resiliently biasing said discs into a normal position wherein the opposed faces of said discs are disposed in axially spaced parallel relationship to each other and to said path, means for moving said shaft toward said path to cause said discs to frictionally grip stock supported on said path, means supporting at least one of said discs upon said shaft for limited tilting movement from said normal position while maintaining the disc coupled to said shaft for rotation therewith to accommodate the entrance of said stock between the faces of said discs, and means for driving said shaft in rotation to cause said discs to longitudinally advance stock engaged between said discs along said path.

2. Stock feeding apparatus for longitudinally feeding elongate rod stock along a predetermined path comprising a shaft mounted for rotation about an axis perpendicular to and offset from said predetermined path, a pair of feed discs mounted on said shaft for rotation therewith, means resiliently biasing said discs into a normal position wherein the opposed faces of said discs are disposed in axially spaced parallel relationship to each other and to said path, means for moving said shaft toward said path to cause said discs to frictionally grip stock supported on said path, means supporting at least one of said discs upon said shaft for limited tilting movement from said normal position while maintaining the disc coupled to said shaft for rotation therewith to accommodate the entrance of stock between the faces of said discs at one side of said shaft, means movable between the faces of said discs at the side of said shaft opposite said one side for urging the faces of said discs toward said normal position to increase the frictional grip of said discs upon said stock, and means for driving said shaft in rotation to cause said discs to longitudinally advance stock engaged between said discs along said path.

3. Stock feeding apparatus for longitudinally feeding elongate rod stock along a predetermined horizontal path comprising a shaft mounted for rotation about a horizontal axis perpendicular to and spaced below said predetermined path, a pair of feed discs mounted on said shaft for rotation therewith in opposed face-to-face relationship, means resiliently biasing said discs into a normal position wherein the opposed faces of said discs are vertically disposed in axially spaced parallel relationship to each other and to said path, said discs being axially spaced on said shaft by a distance less than the thickness of stock to be fed thereby with the space between said discs in vertical alignment with the stock supported on said path, means for moving said shaft upwardly toward said path to cause said discs to frictionally grip stock supported on said path, means supporting at least one of said discs upon said shaft for limited tilting movement from said normal position while maintaining the disc coupled to said shaft for rotation therewith to accommodate the entrance of said stock between the faces of said discs, and means for driving said shaft in rotation to cause said discs to longitudinally advance stock engaged between said discs along said path.

4. Stock feeding apparatus for longitudinally feeding elongate rod stock along a predetermined horizontal path comprising a shaft mounted for rotation about a horizontal axis perpendicular to and spaced below said predetermined path, a pair of feed discs mounted on said shaft for rotation therewith in opposed face-to-face relationship, means resiliently biasing said discs into a normal position wherein the opposed faces of said discs are vertically disposed in axially spaced parallel relationship to each other and to said path, said discs being axially spaced on said shaft by a distance less than the thickness of stock to be fed thereby with the space between said discs in vertical alignment with the stock supported on said path, means for moving said shaft upwardly toward said path to cause the portion of said discs above said shaft to frictionally grip stock supported on said path, means supporting at least one of said discs upon said shaft for limited tilting movement from said normal position while maintaining the disc coupled to said shaft for rotation therewith to accommodate the entrance of said stock between the faces of said discs, means movable between said discs at a location below said shaft for urging said discs toward said normal position to thereby increase the frictional grip of the upper portions of said discs upon said stock, and means for driving said shaft in rotation to cause said discs to longitudinally advance stock engaged between said discs along said path.

5. In combination with a screw machine or the like having a frame and means on said frame for supporting elongate rod stock for longitudinal movement along a predetermined path, stock feeding apparatus for longitudinally advancing rod stock along said path comprising a first shaft mounted in said frame for rotation about a fixed axis perpendicular to and spaced from said path, a housing rotatably mounted on said first shaft, a second shaft mounted in said housing for rotation about a second axis parallel to said first axis, a pair of opposed feed discs mounted on said second shaft for rotation therewith, said discs having opposed flat faces normally disposed in perpendicular relationship to said second axis, means for positioning said discs axially upon said second shaft with the faces of said discs in parallel alignment with stock supported upon said path and with the distance between the opposed faces of said discs being less than the thickness of said stock, means supporting at least one of said discs for tilting movement upon aid shaft to accommodate the entrance of said stock between the faces of said discs, means resiliently resisting tilting movement of said disc from a normal perpendicular relationship with said second axis, means for pivotally moving said housing about said first shaft between a rest position wherein said discs are clear of said path and an operative position wherein stock supported upon said path is resiliently gripped between the opposed faces of said discs, motor means for driving said first shaft in rotation, and means in said housing for transmitting rotation of said first shaft to said second shaft.

6. In combination with a screw machine or the like having a frame and means on said frame for supporting elongate rod stock for longitudinal movement along a predetermined path, stock feeding apparatus for longitudinally advancing rod stock along said path comprising a first shaft mounted in said frame for rotation about a fixed axis perpendicular to and spaced from said path, a housing rotatably mounted on said first shaft, a second shaft mounted in said housing for rotation about a second axis parallel to said first axis, a pair of opposed feed discs mounted on said second shaft for rotation therewith, said discs having opposed flat faces normally disposed in perpendicular relationship to said second axis, means for positioning said discs axially upon said second shaft with the faces of said discs in parallel alignment with stock supported upon said path and with the distance between the opposed faces of said discs being less than the thickness of said stock, means supporting at least one of said discs for tilting movement upon said shaft to accommodate the entrance of said stock between the faces of said discs, means resiliently resisting tilting movement of said disc from its normal perpendicular relationship with said second axis, means for pivotally moving said housing about said first shaft between a rest position wherein said discs are clear of said path and an operative position wherein stock supported upon said path is frictionally gripped between the opposed faces of said disc at one side of said second shaft to be advanced along said path upon rotation of said discs, motor means for driving said first shaft in rotation, means in said housing for transmitting rotation of said first shaft to said second shaft, and means on said frame engageable with said discs while said stock is being fed thereby for increasing the frictional grip of said discs upon said stock.

7. In combination with a screw machine or the like having a frame and means on said frame for supporting elongate rod stock for longitudinal movement along a predetermined horizontal path, stock feeding apparatus for longitudinally advancing rod stock along said path comprising a first shaft mounted in said frame for rotation about a fixed horizontal axis perpendicular to and spaced from said path, a housing rotatably mounted on said first shaft, a second shaft mounted in said housing for rotation about a second axis parallel to said first axis, a pair of opposed feed discs mounted on said second shaft for rotation therewith, said discs having opposed flat faces normally disposed in vertical perpendicular relationship to said second axis, means for positioning said discs axially upon said second shaft with the faces of said discs spaced from each other by a distance less than the thickness of said stock and with said stock vertically aligned with the space between said discs, means fixedly mounting one of said discs upon said shaft with the face of said one disc vertically aligned with one side of said stock, means supporting the other of said discs for tilting movement upon said shaft to accommodate the entrance of said stock between the faces of said discs, means resiliently resisting tilting movement of said other disc from its normal perpendicular relationship with said second axis, means for pivotally moving said housing about said first shaft between a lowered rest position wherein said discs are spaced below said stock and an operative position wherein stock supported upon said path is frictionally gripped between the opposed faces of said discs above said second shaft, motor means for driving said first shaft in rotation, and means in said housing for transmitting rotation of said first shaft to said second shaft.

8. Stock feeding apparatus as defined in claim 7 further comprising means for increasing the frictional grip of said discs upon said stock as said stock is being advanced along said path by said discs.

9. Stock feeding apparatus for longitudinally feeding elongate rod stock along a predetermined path comprising a shaft mounted for rotation about an axis perpendicular to and offset from said predetermined path, a first feed disc fixedly mounted on said shaft and having a flat face engageable with one side of the stock to be fed, a second feed disc on said shaft having a flat face engageable with the opposite side of the stock to be fed in opposed relationship to said first disc, said second feed disc having a coaxial hemispherical recess in one side thereof, means including a hemispherical member coaxially mounted upon said shaft and complementary to said recess slidably seated in said recess to support said second disc for tilting movement upon said shaft, means resiliently biasing said second disc to a normal position wherein the face of said second disc is perpendicular to said shaft, means for axially adjusting said hemispherical member along said shaft to adjust the axial spacing between said discs when said second disc is in said normal position to a distance less than the thickness of said stock to be fed, said second disc being tilted upon said shaft against the action of said resilient means when said stock is engaged between said faces whereby said stock is frictionally gripped between the faces of said discs, means coupling said second disc to said shaft for rotation therewith, and means for driving said shaft in rotation.

10. Stock feeding apparatus as defined in claim 9 further comprising means engageable with said discs while said shaft is being driven by said driving means for urging said second disc toward its normal position to thereby increase the frictional grip of said discs upon said stock.

11. Stock feeding apparatus for longitudinally feeding elongate rod stock along a predetermined path comprising a shaft mounted for rotation about an axis perpendicular to and offset from said predetermined path, a first feed disc fixedly mounted on said shaft and having a flat face engageable with one side of the stock to be fed, a second feed disc on said shaft having a flat face engageable with the opposite side of the stock to be fed in opposed relationship to said first disc, said second feed disc having a coaxial hemispherical recess in one side thereof, means including a hemispherical member coaxially mounted upon said shaft and complementary to said recess slidably seated in said recess to support said second disc for tilting movement upon said shaft, means resiliently biasing said second disc to a normal position wherein the face of said second disc is perpendicular to said shaft, means for axially adjusting said hemispherical member along said shaft to adjust the axial spacing between said discs when said second disc is in said normal position to a distance less than the thickness of said stock to be fed, said second disc being tilted upon said shaft against the action of said resilient means when said stock is engaged between said faces whereby said stock is frictionally gripped between the faces of said discs, means coupling said second disc to said shaft for rotation therewith, means for supporting said shaft for bodily movement between a first position and a second position to selectively engage or disengage said discs with stock to be fed thereby, and means for driving said shaft in rotation.

12. Stock feeding apparatus for longitudinally feeding elongate rod stock along a predetermined path comprising a drive shaft mounted for rotation about a stationary axis perpendicular to and offset from said predetermined path, a housing rotatably mounted upon said drive shaft, a driven shaft mounted in said housing for rotation about a second axis parallel to said stationary axis, means for transmitting rotation of said drive shaft to said driven shaft, a first feed disc fixedly mounted on said driven shaft externally of said housing and having a flat face perpendicular to said driven shaft and aligned with one side of the stock to be fed, a second feed disc on said driven shaft having a flat face engageable with the opposite side of the stock to be fed in opposed relationship to said first disc, said second feed disc having a coaxial hemispherical recess in one side thereof, means including a hemispherical member coaxially mounted upon said driven shaft and complementary to said recess slidably seated in said recess to support said second disc for tilting movement upon said driven shaft, means resiliently biasing said second disc to a normal position wherein the face of said second disc is perpendicular to said driven shaft, means for axially adjusting said hemispherical member along said driven shaft to adjust the axial spacing between said discs when said second disc is in said normal position to a distance less than the thickness of said stock to be fed, said second disc being tilted upon said driven shaft against the action of said resilient means when said stock is engaged between said faces whereby said stock is frictionally gripped between the faces of said discs, means coupling said second disc to said driven shaft for rotation therewith, means for driving said drive shaft in rotation, and means for swinging said housing about said drive shaft between a first and a second position to thereby selectively engage or disengage said discs with said stock.

13. Stock feeding apparatus as defined in claim 12 further comprising means for urging said second disc toward its normal position when said stock is engaged between said discs to thereby increase the frictional grip of said discs upon said stock.

References Cited by the Examiner

UNITED STATES PATENTS

| | | | |
|---|---|---|---|
| 473,254 | 4/92 | Dodge | 74—230.24 |
| 668,581 | 2/01 | Martin | 74—230.24 |
| 2,603,343 | 7/52 | Payne | 226—186 X |
| 3,095,130 | 6/63 | Schultz | 226—155 X |

M. HENSON WOOD, JR., *Primary Examiner.*

ROBERT B. REEVES, *Examiner.*